United States Patent [19]
Winks

[11] Patent Number: 5,932,172
[45] Date of Patent: Aug. 3, 1999

[54] FUMIGATION OF MULTIPLE GRAIN STORAGES FROM A SINGLE SOURCE OF FUMIGANT

[75] Inventor: Robert Gordon Winks, Forest Glen via Nambour, Australia

[73] Assignee: Commonwealth Scientific and Industrial Organisation, Campbell, Australia

[21] Appl. No.: 08/827,903

[22] Filed: Apr. 7, 1997

Related U.S. Application Data

[63] Continuation-in-part of application No. 08/702,119, Aug. 23, 1996, which is a continuation of application No. 08/471,165, Jun. 6, 1995, which is a division of application No. 07/793,438, Feb. 10, 1992, said application No. 08/702,119, is a continuation-in-part of application No. PCT/AU95/00844, Dec. 13, 1995.

[30] Foreign Application Priority Data

| Jun. 27, 1989 | [AU] | Australia | PJ4936 |
| Jun. 25, 1990 | [AU] | Australia | 58584/90 |
| Jun. 25, 1990 | [BR] | Brazil | 9007476 |
| Jun. 25, 1990 | [CA] | Canada | 2060649 |
| Jun. 25, 1990 | [EP] | European Pat. Off. | 90909574 |
| Jun. 25, 1990 | [HU] | Hungary | 53 74/90 |
| Jun. 25, 1990 | [JP] | Japan | 2-509680 |
| Jun. 25, 1990 | [RU] | Russian Federation | 501107213 |
| Jun. 26, 1990 | [ZA] | South Africa | 90/4955 |
| Jun. 27, 1990 | [TH] | Thailand | 011270 |
| May 17, 1993 | [AU] | Australia | 38649/93 |
| Jul. 31, 1993 | [GE] | Georgia | 887/01 |
| Aug. 12, 1993 | [UA] | Ukraine | 93003870 |
| Nov. 29, 1993 | [KZ] | Kazakhstan | 932682 |
| Dec. 14, 1994 | [AU] | Australia | PN0044 |
| Dec. 14, 1995 | [ZA] | South Africa | 95/10647 |
| Jan. 30, 1996 | [SG] | Singapore | 9600639-0 |
| Feb. 12, 1996 | [EP] | European Pat. Off. | 96101969 |

[51] Int. Cl.$^6$ .............................. A01M 13/00; A61L 2/20
[52] U.S. Cl. ................................ 422/32; 422/31; 422/40; 422/292; 422/305; 43/125
[58] Field of Search .................................. 422/32, 31, 40, 422/292, 305; 43/124, 125; 239/76, 124, 302, 450; 137/263, 266, 487, 488, 861

[56] References Cited

U.S. PATENT DOCUMENTS

| 2,119,837 | 6/1938 | Wehrle . |
| 2,131,124 | 9/1938 | Baer et al. . |
| 3,097,916 | 7/1963 | Dawson et al. . |

(List continued on next page.)

FOREIGN PATENT DOCUMENTS

| 0318040 | 5/1989 | European Pat. Off. . |
| 3444942 | 5/1985 | Germany . |

(List continued on next page.)

OTHER PUBLICATIONS

"Flow–through Phosphine Fumigation—A new Technique" by R.G. Winks, CSIRO, Division of Entomology, Canberra, Stored Grain Protection Conference, 1983, Section 5.1.

(List continued on next page.)

*Primary Examiner*—Elizabeth McKane
*Attorney, Agent, or Firm*—Sughrue, Mion, Zinn Macpeak & Seas, PLLC

[57] ABSTRACT

Fumigation of grain in a storage facility having a plurality of grain silos or bins is effected from a single source of a gaseous fumigant. The single source of gaseous fumigant is connected to a gas supply duct through which a carrier gas flows. The gas inlet ports of the silos are also connected to the gas supply duct. The connection between each gas inlet port and the duct is provided with a respective valve and a respective orifice plate, the orifice or aperture of which is sized so that the pressure drop across the orifice plate into the silo is substantially greater than the pressure drop across any other component between the gas source and the silo. With this arrangement, the flow rate of gaseous fumigant through the grain-containing silos in the facility suffers only a minor perturbation when a valve between the duct and a silo is opened or closed. This minor perturbation can be readily compensated by maintaining the gas pressure in the duct at a constant value. The exit gases of the silos in the facility may be recycled through the silos, with the addition of gaseous fumigant periodically or as necessary to maintain a predetermined fumigant concentration.

21 Claims, 3 Drawing Sheets

U.S. PATENT DOCUMENTS

| | | |
|---|---|---|
| 3,206,275 | 9/1965 | Saiv et al. . |
| 3,614,841 | 10/1971 | Query . |
| 4,059,048 | 11/1977 | Dickson . |
| 4,174,732 | 11/1979 | Freese . |
| 4,200,657 | 4/1980 | Cook . |
| 4,410,492 | 10/1983 | Kaye ................................. 422/34 X |
| 4,651,463 | 3/1987 | Friemel . |
| 4,756,117 | 7/1988 | Friemel . |
| 4,812,291 | 3/1989 | Friemel et al. . |
| 4,814,154 | 3/1989 | Doernemann et al. . |
| 5,260,022 | 11/1993 | Schellhaas et al. . |

FOREIGN PATENT DOCUMENTS

| | | |
|---|---|---|
| 3800697 | 7/1989 | Germany . |
| 93/25075 | 12/1993 | WIPO . |

OTHER PUBLICATIONS

"The Effect of Phosphine on Resistant Insects" by R.G. Winks, GASGA Seminar on Fumigation Technology in Developing Countries, TDRI: London, 1986.

"A new way of fumigatig with phosphine", Rural Research 140, Spring 1988, pp. 15–18.

FUMIGATION OF MULTIPLE GRAIN STORAGES FROM A SINGLE SOURCE OF FUMIGANT

CROSS REFERENCE TO RELATED APPLICATIONS

This application (i) is a Continuation-in-Part of application Ser. No. 08/702,119, filed Aug. 23, 1996, which was a Continuation of application Ser. No. 08/471,165, filed Jun. 6, 1995, which was a Divisional application from application Ser. No. 07/793,438, filed Feb. 10, 1992, and (ii) is also a Continuation-in-Part of International patent application No PCT/AU95/00844, filed Dec. 13, 1995.

TECHNICAL FIELD

This invention concerns the fumigation of stored, particulate commodities, such as grain and pulses. More particularly, it concerns a method and arrangement for the simultaneous fumigation, from a single source of a gaseous fumigant, of a number of silos in a commodity storage facility having a plurality of silos.

BACKGROUND

In this specification, for convenience, the term "grain" will be used in the sense that it encompasses not only grain but other particulate foodstuffs or commodities that are commonly stored in bulk, such as peanuts, lentils, peas and other pulses. This list is not intended to be exhaustive. Also, in this specification, the term "grain pests" will encompass the pests usually found in stored "grain" and well known to persons who work in grain storages, being predominantly beetles and some species of moths.

For many years, various chemical pesticides have been applied to stored grain to kill the grain pests that may be present. Many of such chemical pesticides leave residues which can be harmful, and care has to be exercised to ensure that the relevant maximum residue limit is not exceeded. In addition, as noted in the specification of U.S. Pat. No. 3,614,841 to G W Query, there have been "industry . . . accepted practices which are directed to periodic overdoses of insecticide and result in wastage of food products in hopes that such periodic overkill would provide . . . residual protection . . . before the infestation of the food product became sufficiently advanced to require another drastic treatment".

To avoid this last-mentioned problem, Query treats growing crops in greenhouses and the exterior surfaces of multiple storage bins located within essentially sealed enclosures by periodically administering a predetermined quantity of insecticide through spray nozzles in overhead conduits which are located within the greenhouses or enclosures. To ensure that the appropriate quantity of insecticide is used, Query has suggested two techniques. One of those techniques is the discharge into an enclosure of the entire contents of a single canister containing a liquid insecticide and an aerosol propellant, by puncturing the canister with a "puncturing opener" which is connected to a flexible hose that leads to the conduit which contains the overhead spray nozzles. Query's second technique requires periodic injection, into the overhead conduit of each greenhouse or bin enclosure, of a pre-measured quantity of a liquid insecticide, which has been stored with a propellant gas in a respective container mounted outside each greenhouse or bin enclosure. After each administration of insecticide, the respective external container is re-charged with a mixture of the liquid insecticide and propellant gas from a source of such a mixture.

The aforementioned problem with residues has led to the preference for using gaseous fumigants instead of the pesticidal chemicals. And among the gaseous fumigants, phosphine has been preferred because any residue that might be left in the grain will be lost or oxidized to harmless phosphate when the grain is processed to produce a food.

The main problem with applying a gaseous fumigant such as phosphine to a grain storage (such as a silo) concerns dosage rates and maintaining an environment within the grain which ensures proper elimination of the pests. As noted by the present inventor in his paper entitled "Flow-through phosphine fumigation—a new technique" which was delivered to the *Stored Grain Protection Conference*, 1983, if the so-called "one-shot" or "one-pass" technique is used with phosphine from a gas source (for example, from the reaction of moisture with a solid formulation containing aluminium phosphide) being applied to a leaking silo, the concentration of phosphine within the grain in the silo is likely to decay to zero in about 4 or 5 days. Thus the fumigant is ineffective after about 5 days. Even when a fumigant is applied to grain in a completely sealed silo (for example using the techniques described in the specification of U.S. Pat. No. 4,200,657 to J S Cook), there is a decay of the effective concentration of phosphine in the grain as it is absorbed by the grain and used to exterminate grain pests. Thus, whether the fumigant is applied to the grain utilising Cook's one-pass technique or his recirculating technique (each technique, Cook claims, results in a uniform distribution of phosphine or other fumigant within the grain mass before the forced gas flow through the grain mass is discontinued), there will be a significant fall-off in effectiveness of the technique after a relatively short time period. A similar significant reduction of effectiveness is experienced with the one-shot fumigation technique described in the specification of South African patent No 86/4806, which corresponds to Australian patent No 589,646, in the name of The Commonwealth Industrial Gases Limited. That technique simply requires the release of a phosphine-containing gas into the grain mass stored within a silo.

For complete elimination of grain pests, it is essential that a sufficiently high dosage of phosphine remains in the grain mass long enough to ensure that the more tolerant stages (eggs and pupae) in the development of an insect pest mature into a less tolerant stage (larvae or adults) and are killed by the phosphine. In this way, resistant strains of the pests cannot develop.

In a substantially gas-tight silo, the phosphine concentration decays to zero in about 16 days. The work required to make old grain storages gas-tight is costly and is not always successful. An improved fumigation technique, which ensures that an adequate phosphine dosage is always achieved within the grain, is the subject of Australian patent No 640,669.

In many grain storage establishments, a number of silos of different shapes and sizes are built in close proximity to each other and grain is deposited into an empty silo or removed from a silo containing grain, as required. In such systems, as in any multi-silo storage facility, it would be advantageous to provide a single fumigation arrangement, utilizing a single source of phosphine (or other suitable gaseous fumigant) and carrier gas, which ensures that any number of the silos in the facility can be fumigated simultaneously, using fumigant from the single source of gaseous fumigant, without the need to re-design the fumigation system each time a silo is brought into use for grain storage, or is removed from the system because it is about to be emptied of grain.

DISCLOSURE OF THE PRESENT INVENTION

It is an objective of the present invention to provide an arrangement which can be used to implement the simultaneous fumigation of any number of silos in a grain storage facility having a plurality of silos—possibly of different sizes and types—with variation of the number of silos in use at any time, utilizing a single source of a gaseous fumigant.

To achieve this objective, a single source of a gaseous fumigant is connected to a single gas supply duct or inlet manifold, through which a carrier gas (typically air) flows. The gas supply duct is connected to the gas input port of each silo in the grain storage facility. Between the gas supply duct and each silo gas input port, there is a respective on/off valve (which is opened when grain in the silo is to be fumigated and is closed when the silo is empty or is about to be emptied) and a respective orifice plate. Each gas input port should be connected to a respective gas distribution arrangement within its associated silo to ensure that the input gas moves throughout the grain mass in the silo when fumigation is occurring. The orifice or aperture of each orifice plate is scaled or sized to ensure that the maximum pressure drop in the entire fumigation system is a substantial pressure drop across each orifice plate.

This arrangement effectively renders the fumigation system as a whole insensitive to variations in the system downstream of an orifice plate. Thus if, after commissioning an installation and establishing steady state conditions, different commodities are stored in the bins, or a bin has less or more of a commodity in it (that is, there is a change in the bin-fill ratio), the orifice plates do not have to be adjusted or modified to allow for the different back pressures downstream of the orifice plates. In addition, if a silo containing grain is to be emptied of grain and the valve in the connection between that silo and the gas supply duct is closed, there will be only a minor perturbation of the gas supply to the input ports of the remaining silos in the system, and the minor correction in gas flow that is required to compensate for the removal of a silo from, or the addition of a silo to the system can be effected by bringing the pressure within the gas supply duct back to its steady state value by adjustment of a suitable control mechanism for the supply of gas to the gas supply duct.

Thus, according to the present invention, there is provided a method of simultaneously fumigating particulate commodities stored in a plurality of silos of a storage facility, using a gaseous fumigant supplied by a single source and a carrier gas, each silo having a gas inlet port at or near the base thereof, said method comprising (a) establishing a flow of a mixture of said gaseous fumigant and carrier gas through a single gas supply duct;

(b) connecting the inlet port of each silo directly to said single gas supply duct;

(c) providing each inlet port of each silo with an orifice plate having an aperture, the size of the aperture being such that the pressure drop between said gas supply duct and the associated silo is substantially greater than the pressure drop across any other component between said single source of gaseous fumigant and the silo with which the orifice plate is associated; and (d) maintaining a substantially uniform gas pressure within said gas supply duct.

Also according to the present invention, there is provided an arrangement for effecting the simultaneous fumigation of any number of silos in a grain storage facility having a plurality of silos or bins, said arrangement comprising:

(a) a single gas supply duct through which a carrier gas flows;

(b) a single source of a gaseous fumigant connected to said gas supply duct;

(c) control means for varying the supply of said gaseous fumigant from said source to said gas supply duct; and (d) a respective direct connection between said gas supply duct and a gas inlet port at or near the base of each silo in the facility, each said connection including a valve and an orifice plate, each orifice plate having an aperture which is sized to provide a pressure drop across the orifice plate which is substantially greater than the pressure drop across any other component between said single source of gaseous fumigant and the silo with which the orifice plate is associated.

The carrier gas is conveniently air, with the flow through the gas supply duct being established by a blower or fan. The control means of feature (c) of the apparatus of the present invention may comprise a control valve between the source of gaseous fumigant and the gas supply duct, or it may comprise any suitable arrangement for controlling the rate of supply of carrier gas to the gas supply duct (for example, means to vary the speed of the fan mentioned above.

Once such a system has been set up to establish the required flow rate of the mixture of gaseous fumigant and carrier gas through the silos or bins, the flow rate through the grain in each silo or bin containing grain can be maintained at the required level when an on/off valve in a connection between the gas supply duct and a silo is opened or closed, simply by varying the operating conditions of the system to maintain a substantially constant pressure of the gas within the gas supply duct.

The fumigation arrangement of the present invention was designed for use with a plurality of vertical silos (that is, silos having a height to width ratio of at least 1.5 to 1). However, the system is equally applicable to grain storage facilities comprising silos or bins of different types and capacities.

Preferably, the fumigation method practised with the present invention will be that described in the specification of Australian patent No 640,669, the contents of which are incorporated into this specification by this reference to Australian patent No 640,669.

It will be appreciated that if the silos or bins of the multi-silo storage facility are vented to the atmosphere, gaseous fumigant will be constantly lost from the fumigation system. However, the present invention can be adapted to form a recirculating arrangement in which the loss of gaseous fumigant is minimised. In such an implementation of the present invention, the outlet at the top of each silo or bin is connected to a second duct (an outlet manifold) which is joined, via a gas conduit which contains a recirculating fan (also called a "blower"), to the gas supply duct (the inlet manifold). The recirculation circuit thus established is provided with a valve (which has been termed a system valve) which is adjusted whenever a bin is added to or removed from the recirculation circuit, to ensure that the static pressure in the gas supply duct or inlet manifold is maintained at a value which provides the required flow of fumigating gas through each operational silo or bin in the storage facility. That is, the setting of this system valve is adjusted to compensate for the perturbation of the static pressure in the gas supply duct when there is a change in the number of bins being fumigated, which occurs (a) when the connection to the inlet port of a silo or bin is "closed" (for example, when a bin is about to be emptied), and (b) when a previously closed connection to the inlet port of a bin in the storage facility is "opened" to the fumigating gas.

Thus, according to this modified form of the present invention, there is provided a method of simultaneously fumigating particulate commodities stored in a plurality of silos or bins of a storage facility using a single source of gaseous fumigant, each silo or bin having a gas inlet port and a gas outlet port, said method comprising:

(a) connecting the inlet port of each silo or bin to a single gas supply duct;

(b) connecting the outlet port of each silo or bin to a single gas outlet duct;

(c) forming said gas supply duct, said gas outlet duct, a gas movement means (for example, a blower or fan), and said silos or bins into a gas recirculation circuit, said silos or bins being included in parallel in said recirculation circuit;

(d) providing a system control valve in said recirculation circuit downstream of said gas movement means, said system control valve being adjustable to maintain the static pressure within said gas supply duct at a predetermined value or within a predetermined range of values;

(e) providing each inlet port of each silo or bin with an orifice plate having an aperture which is sized so that there is a substantial pressure drop between said gas supply duct and the interior of the associated silo or bin; and (f) connecting a source of gaseous fumigant to said recirculation circuit for the controlled supply of gaseous fumigant thereto.

Also according to this modified form of the present invention, there is provided a fumigation arrangement for the simultaneous fumigation of a number of silos or bins in a storage facility comprising a plurality of silos or bins, each silo or bin having a gas inlet port and a gas outlet port, said fumigation arrangement comprising:

(a) a single gas supply duct to which the gas inlet port of each silo or bin is connected;

(b) a single gas outlet duct to which the gas outlet port of each silo or bin is connected;

(c) a gas conduit between said gas outlet duct and said gas supply duct, connected to form a gas recirculation circuit comprising said gas supply duct, said gas outlet duct, said gas conduit and said silos or bins; said silos or bins being included in parallel in said recirculation circuit;

(d) gas movement means (for example, a blower or fan) included in said gas recirculation circuit;

(e) a system control valve in said recirculation circuit downstream of said gas movement means, said system control valve being adjustable to maintain the static pressure within said gas supply duct at a predetermined value or within a predetermined range of values;

(f) a respective orifice plate included in each of said gas inlet ports, each orifice plate having an aperture which is sized so that there is a substantial pressure drop between said gas supply duct and the interior of the associated silo or bin; and (g) a single source of gaseous fumigant connected to said gas recirculation circuit, for the controlled supply of gaseous fumigant thereto.

Any suitable source of fumigant gas may be used with this recirculating fumigant method and arrangement (including a packaged source of phosphine of the type described in the specification of International patent application No PCT/AU93/00270, which is WIPO Publication No WO 93/25075). If the fumigant source is a cylinder of fumigant gas, the fumigation arrangement will preferably (unless a "one-shot" fumigation technique is contemplated) include fumigant gas injection apparatus which ensures that the concentration of fumigant in the recirculating gas is increased when it reaches or falls below a predetermined minimum value. The fumigant gas injection apparatus may comprise a fumigant gas sensor in the gas supply duct, the output signal of this sensor being monitored by a microprocessor which is programmed to cause additional fumigant gas to be supplied to the recirculation circuit whenever the concentration of fumigant gas falls below a pre-determined level. Alternatively, this apparatus may comprise a mechanism which provides a periodic injection into the recirculating gas of a quantity of fumigant, the frequency of this injection and the amount of fumigant added being based on the observed leakage rates of the bins.

These and other features of the present invention and its modified form will be exemplified in the following description of realisations of the present invention. In the following description, which is provided by way of example only, reference will be made to the accompanying drawings.

BRIEF DESCRIPTION OF THE ACCOMPANYING DRAWINGS

FURTHER DISCUSSION OF THE PRESENT INVENTION

Figure 1:
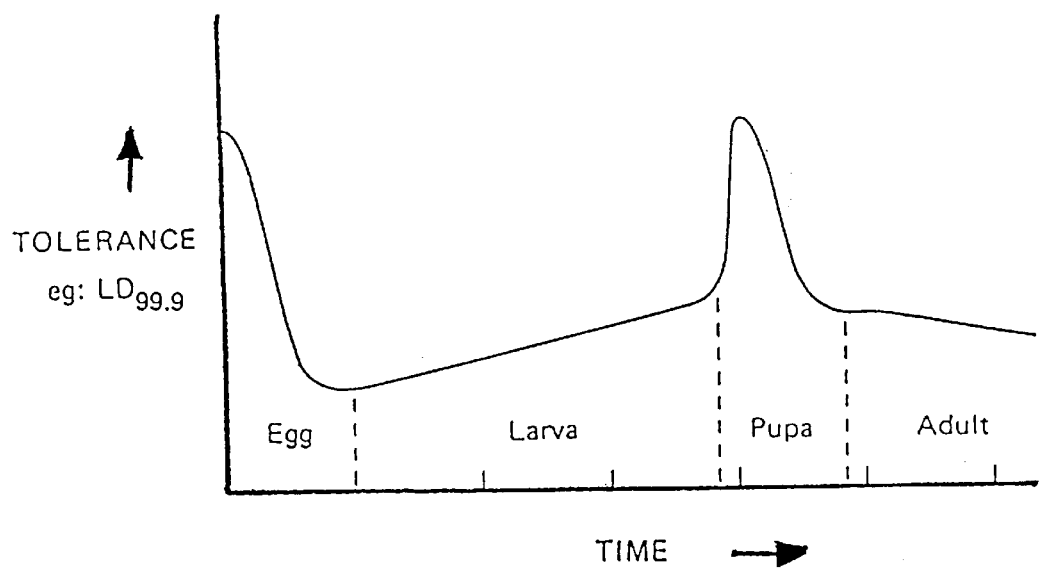
FIG. 1 is a diagram showing the changes in phosphine tolerance of a typical grain pest during its development.

The diagram of FIG. 1 has appeared previously (i) in the paper by Dr R G Winks entitled "The effect of phosphine on resistant insects", which is included in the *Proceedings of the CASGA Seminar on Fumigation Technology in Developing Countries,* 1986, pages 105 to 118, and (ii) in the article entitled "A new way of fumigating with phosphine", which appeared in *Rural Research,* No 140, Spring 1988, pages 15 to 18. This diagram shows how insect eggs and the pupal stage of the development of a beetle or other grain pest is significantly more resistive to fumigation than the larval and adult stages. Thus if a grain storage is fumigated at a constant concentration of phosphine, the concentration must be sufficiently high to destroy all eggs and pupae, or it must be maintained at a value which is adequate to kill all adult pests and their larvae for a time sufficient for the more tolerant eggs to become the less tolerant larvae and for the pupae to become adults.

Figure 2:
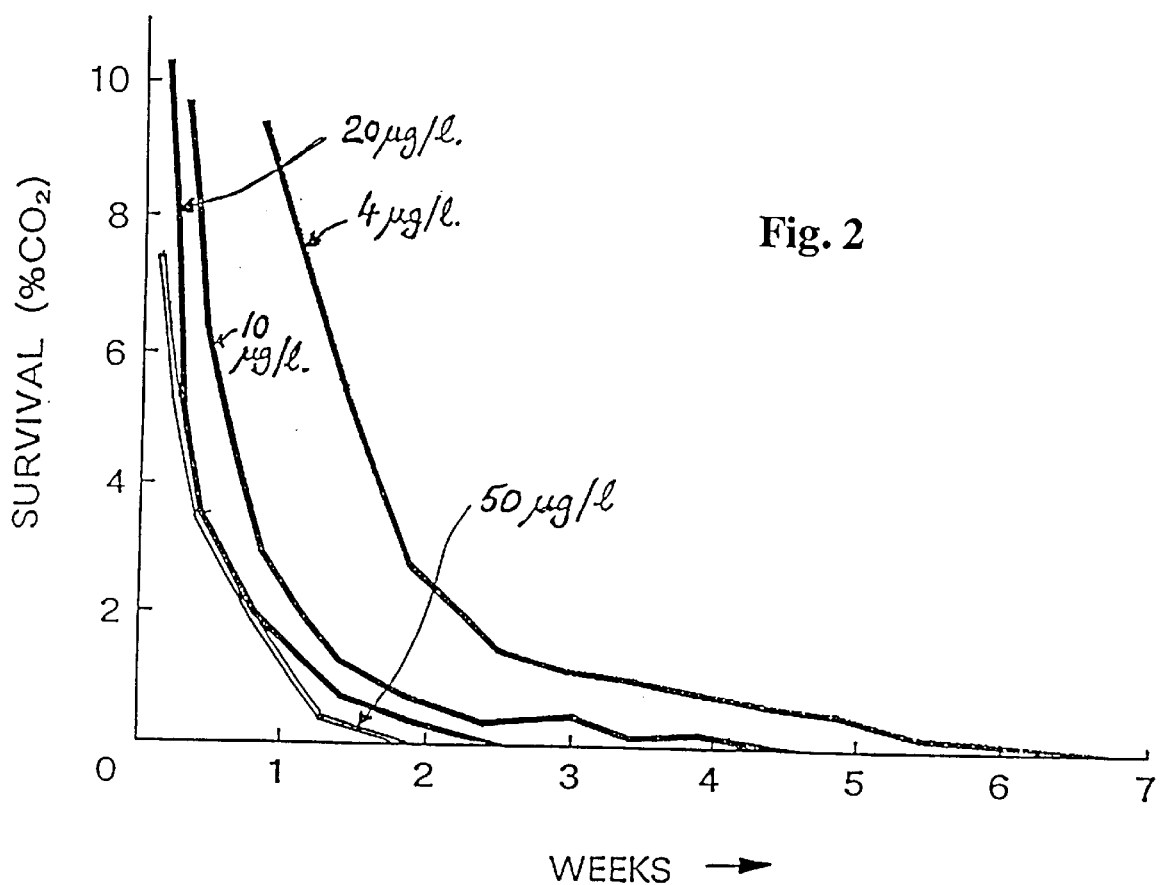
FIG. 2 illustrates the reduction in the survival of grain pests within a grain sample when the grain is subjected to fumigation with constant concentrations of phosphine.

By monitoring the carbon dioxide production (from insect respiration) in a sample of grain which was infested with *Sitophilus granarius*, to which phosphine was supplied at a constant concentration, the results displayed in graph form in FIG. 2 were obtained. These results show that even with phosphine concentrations as low as 4 micrograms per liter at a temperature of 25° C., all stages of the pest had been destroyed after a period of about 6.5 weeks. These results also show that the time for all insect stages to be destroyed decreases as the phosphine concentration is increased. Similar results have been obtained using other concentrations of phosphine and with infestations of other species of grain pests (including *Tribolium castaneum, Rhyzopertha dominica, Sitophilus oryzae, Sitophilus zeamais, Bruchus pisorum, Oryzaephilus surinamensis* and *Ephestia cautella*). From the experimental data obtained, it has been found that all insect pests are killed in a reasonable time with a constant phosphine concentration of at least 4 micrograms per liter. With phosphine concentrations of 2 micrograms per liter, the insect population of the grain increased with time when the pest was *Sitophilus granarius* and *Sitophilus oryzae*. Thus concentrations of phosphine lower than 4 micrograms per liter do not effectively fumigate a grain mass.

Although it may appear, at first sight, that increasing the concentration of phosphine in the carrier gas also increases the efficacy of the fumigation technique, this conclusion is incorrect. There are also economic factors to consider. A detailed assessment of economic factors has shown that in a "flow through" fumigation arrangement (that is, an arrangement in which the mixture of gaseous fumigant and carrier gas is not recycled), at concentrations in excess of 200 micrograms of phosphine per liter, fumigant is being wasted. Thus the phosphine concentration in the carrier gas should be kept within the range of from 4 to 200 micrograms per liter. For an effective yet economical fumigation technique, the concentration of phosphine should be held at a constant value selected from within the concentration range of from 4 to 100 micrograms per liter, preferably in the range from 4 to 50 micrograms per liter, with due consideration being given to the times to insect population extinction for the concentration chosen. In an arrangement in which the mixture of fumigant and carrier gas is recycled, however, cocentrations of fumigant in excess of 200 micrograms per liter may not be uneconomical, particularly in a well-sealed system, because the gaseous fumigant is not all lost to the atmosphere.

Figure 3:
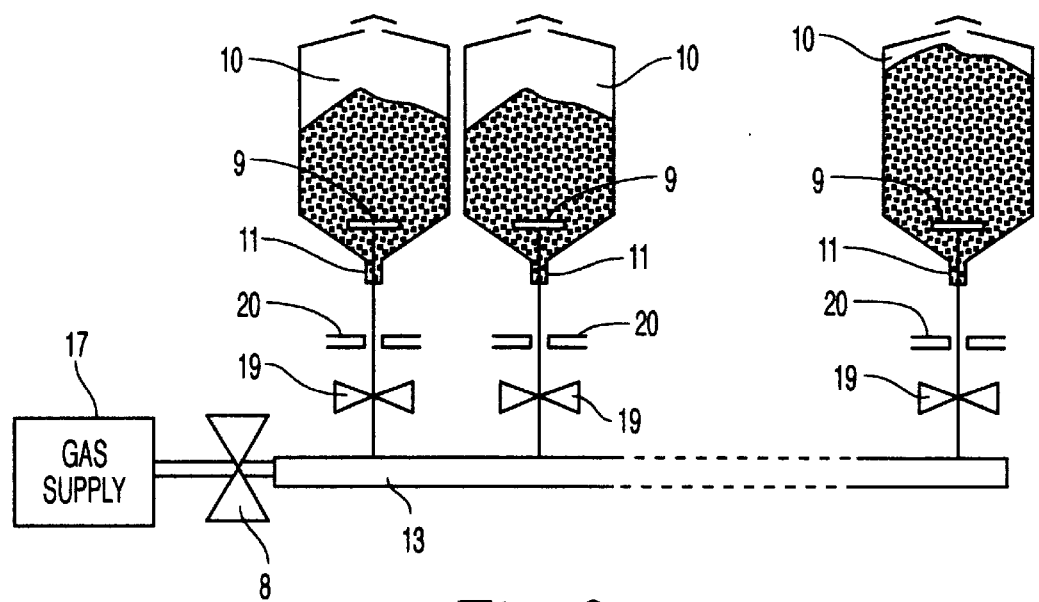
FIG. 3 is a schematic diagram of a multi-silo fumigation system constructed in accordance with the present invention.

Referring now to FIG. 3, the schematically illustrated embodiment of the present invention comprises a source 17 of a fumigant-containing gas which is supplied under a pressure of about 500 to 700 Pa (that is, a pressure of about 2 inches water gauge). This pressure is usually established by a fan (not shown in FIG. 3) which provides a flow of the carrier gas, into which the fumigant gas (preferably phosphine) is introduced by conventional techniques. The source 17 of gas is connected to a gas supply duct or inlet manifold 13 by a control valve 8. The gas supply duct 13 is connected to a gas entry port 11 of each silo 10 in the system by a respective connection comprising an on/off valve 19 and an orifice plate 20. Preferably a distributor 9 (for example, a louvre arrangement) is provided in each silo to ensure that the carrier gas and its fumigant are distributed within the grain mass in such a manner that a uniform flow of gas is established within each grain mass.

The orifices or apertures in the orifice plates 20 are set so that the maximum pressure drop in the system (when fumigation of the grain in the silos is in progress) is across the orifice plates. As explained earlier in this specification, a steady state fumigation system is set up with the required gas flow through the masses of grain being fumigated. This steady state operating condition will be perturbed to only a small degree if an additional silo or bin is brought into the system, or if one of the valves 19 is closed because fumigation of the contents of a silo is no longer required (for example, when the silo is to be emptied of grain). Such a minor perturbation can be readily corrected by adjusting the setting of the control valve 8 so that the pressure of gas in the gas supply duct or inlet manifold 13 is returned to its steady state value, whereupon the system will again be operating in its required manner. In addition, and perhaps more importantly, when the present invention is used, only very minor changes in pressure in the gas supply duct are experienced if a bin should be only partly filled, or if some of the bins of the storage facility contain different commodities.

If phosphine is the gaseous fumigant, the phosphine may be obtained from a cylinder of a pressurised mixture of phosphine and carbon dioxide. However, as noted earlier in this specification, an on-site generator or a packaged phosphide formulation may be the preferred source of phosphine in areas where a regular supply of gas cylinders cannot be guaranteed.

Variations to the arrangement shown in FIG. 3 are possible. As already noted, the control valve 8 may be replaced with an alternative arrangement for controlling the supply of fumigant-containing gas to the duct 13. For example, the control of the gas supply could be by variation of the speed of a fan that is used to provide carrier gas to the gas mixture supply 17, or by the use of multiple fans which are brought into the system, with their speeds varied, as required.

Figure 4:
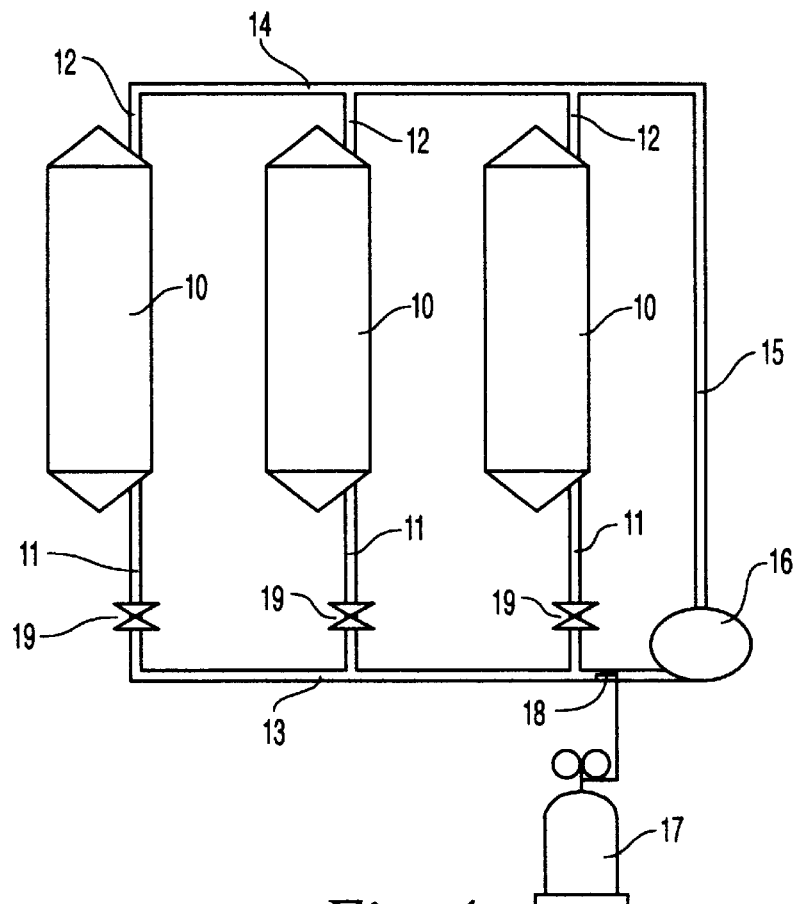
FIG. 4 illustrates, schematically, a known fumigation arrangement whereby multiple bins of a storage facility may be fumigated, one at a time, using a single source of fumigant gas and recirculation of a mixture of the fumigant gas and a carrier gas.
Figure 5:
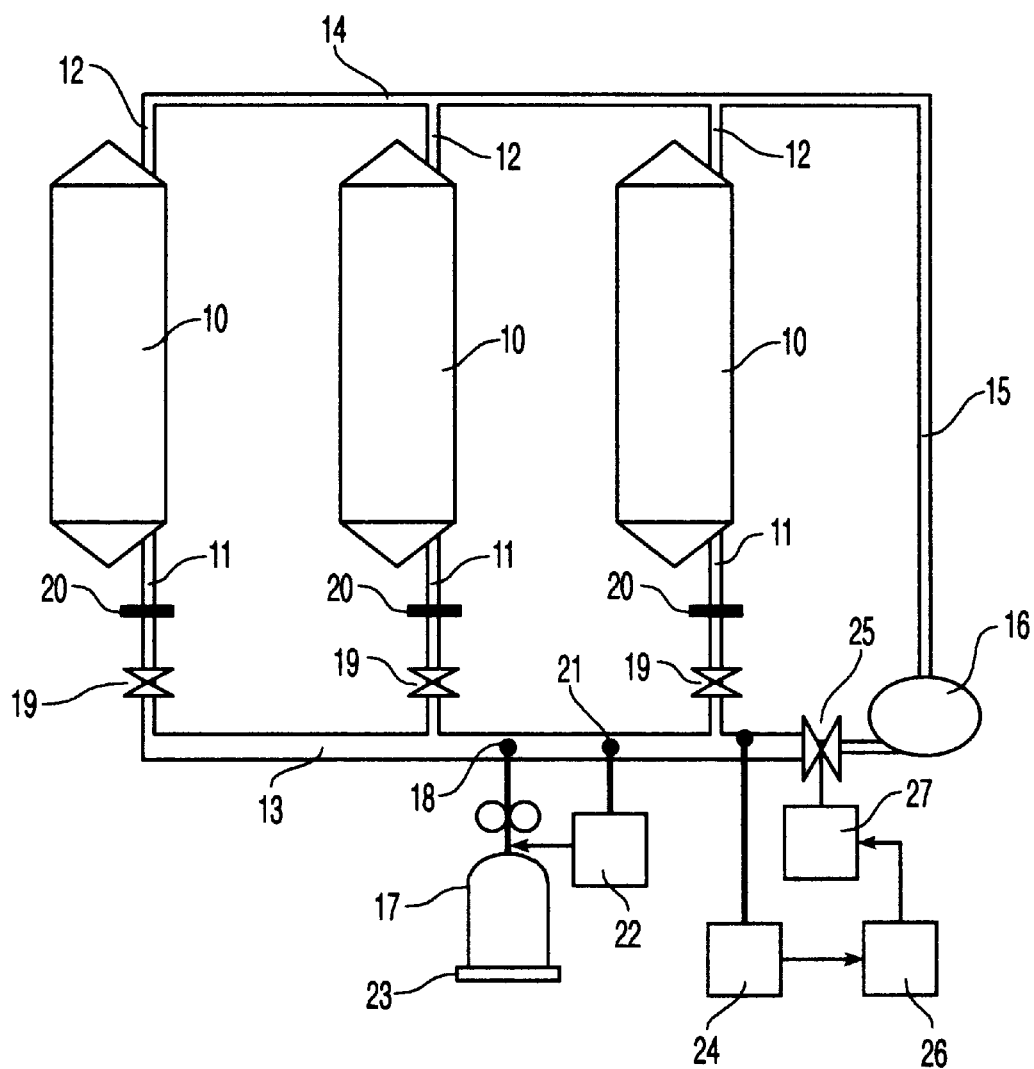
FIG. 5 illustrates, also schematically, a multi-bin storage facility in which simultaneous fumigation of each bin of the facility is effected in accordance with the modified form of the present invention.

In FIGS. 4 and 5, the same reference numerals have been used to identify components which are common to these illustrated fumigation arrangements and the arrangement of FIG. 3.

FIGS. 4 and 5 each illustrate an arrangement of three silos or bins 10, each having an inlet port 11 and an outlet port 12, which are included, in parallel, in a gas recirculation circuit which also includes a gas supply duct or manifold 13, a gas outlet duct or manifold 14, a gas connecting duct or conduit 15 and a blower or fan 16. A supply of a fumigant gas (which is shown in the drawings as a cylinder 17 containing a pressurised mixture of carbon dioxide and phosphine, but which in practice may be any suitable source of a gaseous fumigant) is connected to the duct 13, to inject fumigant gas, as required, through a nozzle 18. The silos or bins 10 each contain a quantity of a particulate commodity. Each inlet port of the bins 10 is supplied with an on/off valve 19.

In the known FIG. 4 arrangement, to fumigate the contents of the bins 10, the valve 19 in the gas inlet port 11 of one of the silos or bins is opened and the valves 19 in the gas inlet ports of the other bins are closed. Fumigation of the bin having its associated valve 19 open is then effected using the conventional recirculating fumigant technique. When fumigation of the contents of that bin is completed, the opened valve 19 is closed and one of the other valves 19 is opened. Fumigation of the contents of the bin which then has its associated valve 19 open is then effected. This procedure is repeated until the stored commodity in each bin of the storage facility has been fumigated.

Clearly, the fumigation of a number of silos, one at a time, using the known arrangement illustrated in FIG. 4, takes considerable time when phosphine is the fumigant, and there is the problem of potential re-infestation of the fumigated contents of a bin while the commodity stored in another bin is being fumigated.

In the modified arrangement of the present invention that is illustrated in FIG. 5, an adjustable system valve 25 is included in the gas recirculation circuit. The system valve 25 is used to maintain the static pressure in the duct 13 at a predetermined value or within a predetermined range of values.

Normally a manometer 24 will be used to set the static pressure in (and hence the flow rate of gas through) the gas supply duct 13. Control of the setting of the system valve 25 to establish the required static pressure in the duct 13 is normally effected by an operator at the start of the fumigation, when (i) whenever the fumigation of a silo has ceased and that silo is removed from the recirculation circuit, or (ii) a new silo is added to the recirculation circuit. Alternatively, control of the setting of the system valve 25 may be effected automatically, using an electrical signal generated by the manometer and input to a microprocessor 26 which is programmed to generate a control signal to drive a motor (preferably a stepping motor) 27 which mechanically varies the setting of the system valve 25. Such servo-systems for maintenance of a predetermined pressure in a chamber, duct or the like are known per se.

As in the arrangement shown in FIG. 3, each bin or silo 10 of the FIG. 5 arrangement is provided with an orifice plate 20 at its inlet port. The aperture or orifice of each orifice plate 20 is sized so that gas flows through its associated silo at a required rate when the gas pressure in the gas supply duct 13 is at its required predetermined value. The commodities stored in any number of bins in the storage facility may then be fumigated, simultaneously, by opening the respective valves 19 and adjusting the system valve 25 to establish the required static pressure in the duct or manifold 13.

When a fresh fumigation of silos is established, the operating conditions of the fumigation system are re-established. The perturbation to the flow of fumigant-containing gas that is caused by opening a hitherto closed valve 19 to enable the fumigation of the commodity stored in another silo 10, or by closing one of the opened valves 19 to remove one of the bins 10 from the fumigation process (for example, when that bin is to be emptied of its commodity), is corrected by adjusting the setting of the system valve 25 to return the pressure in the gas supply duct 13 to its required value. When such an adjustment of the valve 25 has been made, the fumigant-containing gas will again be passed simultaneously through the "opened" bins or silos 10, in parallel, at the respective required rates.

The addition of fumigant to the recirculating gas, to compensate for losses due to leakage and sorption by a commodity in the bins being fumigated, may be effected manually. For manual control of the addition of fumigant, earlier monitoring of the operation of the storage system is required to establish, empirically, for the conditions under which the storage bins are being used, (i) when fumigant has to be added to the recirculating gas, and (ii) how much fumigant needs to be added, to maintain at least the required minimum concentration of fumigant in the recirculating gas.

Such periodic addition of fumigant to the recirculating gas may be effected automatically, using a known form of metering device, which is connected to a cylinder that contains the gaseous fumigant under pressure and which is operated by a timer-controlled solenoid.

However, the preferred arrangement for the addition of fumigant to the recirculating gas, to compensate for leakage and sorption, is shown in FIG. 5. The concentration of fumigant in the gas in the gas supply duct 13 is monitored by a fumigant gas sensor 21. The output signal of the sensor 21 is connected to a microprocessor 22, which may be integrated with the microprocessor 26. The output of the microprocessor 22 is adapted to control the supply of gaseous fumigant from the cylinder 17 to the gas supply duct 13. Whenever the output signal from the fumigant sensor 21 indicates that the concentration of phosphine (or other gaseous fumigant) in the duct 13 has fallen below a predetermined value, the microprocessor 22 causes the release of further fumigant from the cylinder 17 until at least the predetermined value of the fumigant concentration in the recirculating gas has been established. Using this arrangement, the concentration of fumigant in the recirculating gas is automatically increased to maintain a required minimum value and compensate for different rates of gas loss from the bins 10.

The cylinder 17 may be mounted on scales 23, which are used to monitor the quantity of liquefied gas remaining in the cylinder 17. If desired, a known form of apparatus which generates an alarm signal if the liquefied gas in the cylinder 17 should reach a low level may be included in the fumigation arrangement.

An advantage of the fumigation arrangement illustrated in FIG. 5 and described above is that, by adjusting the apertures in the orifice plates 20 so that the flow of gas through each silo or bin has substantially the same linear velocity, and each silo has substantially the same inlet pressure, leaks in the tops or bases of the silos have minimal effect.

If the bins 10 are all sealed to a gas-tightness standard and there is little difference in the very low leakage rates of, or the distribution of leaks between, the bins, it is a simple matter to establish a satisfactory distribution of fumigant in each bin of the system. Under these conditions, there will be a very low decay rate of the fumigant concentration in the recirculating gas. The only significant loss of fumigant will be by sorption by a stored commodity in the bins. Thus the "one shot" fumigation technique may be practised, provided the single injection of fumigant gas into the recirculation circuit is such that the concentration of fumigant in the recirculating gas at the end of a specified period of fumigation is not lower than the minimum required concentration. Alternatively, and preferably, a "slow release" source of fumigant gas (such as one of the packaged formulations described in the specification of International patent application No PCT/AU93/00270 -WIPO Publication No WO 93/25075) may be included in the recirculation circuit, in the knowledge that the generation of fresh fumigant will compensate for the low leakage from the bins and the sorption of the fumigant by the stored commodity, and thus a low (but acceptable) level of fumigant will be available for the entirety of the fumigation process.

The control of the supply of fumigant using a microprocessor, as illustrated in FIG. 5, is particularly useful when there are larger—and possibly different—leakages from the bins 10. If there are holes in the tops and bottoms of the bins, leakage of gas from the lower holes and ingress of outside air through the higher holes can occur, with a consequential rapid dilution of the concentration of the gaseous fumigant. In this situation, the sensor 21 and its associated microprocessor 22 will ensure that a predetermined concentration of fumigant gas is maintained in the gas supplied to the bins 10 at all times.

It will be appreciated that the pressure conditions within the recirculation circuit are such that if the bottoms of the bins 10 and the walls of the bins 10 are essentially sealed and free of leaks, diluent air will not be drawn into the recirculation circuit through holes in the tops of the bins, even with different sized holes in the various bins. Similarly, if the tops of the bins and the walls of the bins are essentially sealed, diluent air will not be drawn into the recirculation circuit through holes in the bottoms of the bins.

Although reference has been made, above, to the fumigation process (which has been called the "SIROFLO" process) which is described in the specification of Australian patent No 640,699 (granted on the Australian patent application derived from International patent application No PCT/AU90/00268), and to the phosphine sources described in the specification of International patent application No PCT/AU93/00270, it is not necessary for the fumigant gas to be phosphine. Any suitable gaseous fumigant—including carbonyl sulphide and cyanogen—may be used in the present invention.

Trials of the present invention have been conducted at the Black Mountain site of the Commonwealth Scientific and Industrial Research Organisation, in the Australian Capital Territory, Australia, where a storage facility comprising three silos, each of 50 tonnes storage capacity, has been established. The top of each of these silos is provided with a removable circular manhole of diameter 148 mm. The bottom or base of each silo is provided with a removable circular manhole of diameter 100 mm. As each of these silos is constructed to be gas tight, the manholes are being used to simulate leaks from the tops and bottoms of the silos. The silos or bins have been configured, at different times, as shown in FIGS. 3 and 5.

The trials of the present invention have shown that it is effective in maintaining an efficacious fumigant concentration in the bins, irrespective of whether one, two or three bins have been included in the gas recirculation circuit. In particular, the trials have shown that (a) with leaks in the tops (only) of the bins (up to and including the removal of all three manhole covers), the decay rate of phosphine is exponentially related to the total area of the "leaks", varying from $y=32.979e^{-0.178x}$ (where y is the leakage rate and x is the total area of the leaks) with no leak, to $y=185.9e^{-2.7163x}$ with a 148 mm diameter top leak and all three bins in the recirculation circuit, to $y=3203e^{-5.1911x}$ when all three bins are in the recirculation circuit and all three top manhole covers are removed;

(b) with leaks in the bases (only) of the silos, the effect of the leaks is similar to, but less significant than, the effect of leaks in the tops of the silos, ranging from $y=41.359e^{-0.2759x}$ with a 100 mm diameter leak in the base of one bin only, to $y=51.529e^{-0.3361x}$ with a 100 mm diameter base leak and all three bins in the recirculation circuit;

(c) with openings in both the tops and bases (bottoms) of the silos, the decay rate of phosphine is similar to that observed with top leaks only; and (d) in all configurations of the multiple-bin storage facility, it is possible to maintain an efficacious minimum concentration of phosphine in the fumigation system by a regular periodic injection of phosphine, and the intervals between the additions of phosphine are such that the multiple-bin fumigation with recirculation of fumigant-containing gas is very economical, less fumigant gas being required than the quantity of gaseous fumigant that would be required for a flow-through system, using the "SIROFLO" technique that is described in the specification of Australian patent No 640,699.

It should be noted that although exemplary embodiments of the present invention have been illustrated in this specification, and described above, variations to, and modifications of, those embodiments may be made without departing from the present inventive concept.

I claim:

1. A method of simultaneously fumigating particulate commodities stored in a plurality of silos of a storage facility, using gaseous fumigant supplied by a single source and a carrier gas, each silo having a base and a gas inlet port at or near said base, said method comprising (a) establishing a flow of a mixture of said gaseous fumigant and carrier gas through a single gas supply duct;

(b) connecting the inlet port of each silo directly to said single gas supply duct;

(c) providing each inlet port of each silo with an orifice plate having an aperture which is sized so that the pressure drop between said gas supply duct and the associated silo is substantially greater than the pressure drop across any other component between said single source of gaseous fumigant and the silo with which the orifice plate is associated; and (d) maintaining a substantially uniform gas pressure within said gas supply duct.

2. A method as defined in claim 1, in which the gaseous fumigant is phosphine and the concentration of phosphine in said gas supply duct is at least 4 micrograms per liter.

3. A method as defined in claim 2, in which the concentration of phosphine in said gas supply duct is in the range of from 4 to 200 micrograms per liter.

4. An arrangement for effecting the simultaneous fumigation of a selected number of silos in a grain storage facility comprising a plurality of silos, each silo having a base, said selected number being variable from two to the total number of silos in the facility, said arrangement comprising:

(a) a single gas supply duct through which a carrier gas flows;

(b) a single source of a gaseous fumigant connected to said gas supply duct;

(c) control means for varying the supply of said gaseous fumigant from said source to said gas supply duct; and (d) a respective direct connection between said gas supply duct and a gas inlet port at or near the base of each silo in the facility, each said connection including a valve and an orifice plate, each orifice plate having an aperture which is sized to provide a pressure drop across the orifice plate which is substantially greater than the pressure drop across any other component between said gas mixture source of gaseous fumigant and the silo with which the orifice plate is associated.

5. An arrangement as defined in claim 4, including respective means within each silo, operatively connected to the gas inlet port of its respective silo, for distributing the mixture of carrier gas and fumigant within the grain mass in its associated silo.

6. An arrangement as defined in claim 4, in which said control means comprises a control valve between said single source and said gas supply duct.

7. A method of simultaneously fumigating particulate commodities stored in a plurality of silos of a storage facility using a single source of gaseous fumigant, each of said silos having a base, a gas inlet port and a gas outlet port, said method comprising:

(a) connecting the inlet port of each silo to a single gas supply duct;

(b) connecting the outlet port of each silo to a single gas outlet duct;

(c) forming said gas supply duct, said gas outlet duct and a gas movement means into a gas recirculation circuit for use with said silos; said recirculation unit, when in use, including said silos in parallel; said recirculation circuit containing a carrier gas;

(d) providing a system control valve in said recirculation circuit downstream of said gas movement means, said system control valve being adjustable to maintain the static pressure within said gas supply duct at a predetermined value or within a predetermined range of values;

(e) providing each inlet port of each silo with an orifice plate having a fixed aperture, sized so that there is a substantial pressure drop between said gas supply duct and the interior of the associated silo or bin; and (f) connecting said single source of gaseous fumigant to said recirculation circuit for the controlled supply of gaseous fumigant thereto.

8. A fumigation method as defined in claim 7, including the step of monitoring the concentration of fumigant in said carrier gas and injecting fumigant into said gas supply duct when that concentration of fumigant is below a predetermined value.

9. A fumigation method as defined in claim 7, including the step of periodically injecting a predetermined quantity of fumigant into said gas recirculation circuit.

10. A fumigation method as defined in claim 9, in which said injection of fumigant is into said gas supply duct.

11. A method as defined in claim 7, in which the gaseous fumigant is phosphine and the concentration of phosphine in said gas supply duct is at least 4 micrograms per liter.

12. A method as defined in claim 11, in which the concentration of phosphine in said gas supply duct is in the range of from 4 to 2000 micrograms per liter.

13. An arrangement for the simultaneous fumigation of a selected number of silos in a storage facility comprising a plurality of silos, said selected number being variable from two to the total number of silos in said facility, each silo in said facility having a gas inlet port and a gas outlet port, said arrangement comprising:

(a) a single gas supply duct to which the gas inlet port of each silo in said facility is connected;

(b) a single gas outlet duct to which the gas outlet port of each silo in said facility is connected;

(c) a gas conduit between said gas outlet duct and said gas supply duct, connected to form a gas recirculation circuit comprising said gas supply duct, said gas outlet duct, said gas conduit and said silos in said facility; said silos in said facility being included in parallel in said recirculation circuit; said recirculation circuit containing a carrier gas;

(d) gas movement means included in said gas recirculation circuit;

(e) a system control valve in said recirculation circuit downstream of said gas movement means, said system control valve being adjustable to maintain the static pressure within said gas supply duct at a predetermined value or within a predetermined range of values;

(f) a respective orifice plate included in each of said gas inlet ports, each orifice plate having an aperture which is sized so that there is a substantial pressure drop between said gas supply duct and the interior of the associated silo, and (g) a single source of gaseous fumigant connected to said gas recirculation circuit, for the controlled supply of gaseous fumigant thereto.

14. An arrangement as defined in claim 13, including a fumigant gas sensor in said gas supply duct, said gas sensor being adapted to monitor the concentration of fumigant in the gas in said gas supply duct.

15. An arrangement as defined in claim 14, in which (a) said single source of gaseous fumigant is a cylinder containing said gaseous fumigant under pressure, said cylinder having a gas outlet connected to said gas supply duct;

(b) said sensor produces a first electrical signal indicative of the concentration of fumigant at said sensor; and (c) said first electrical signal is input to a microprocessor which is programmed to generate a second electrical signal which is adapted to control the supply of fumigant gas from said cylinder to said gas supply duct.

16. An arrangement as defined in claim 13 in which said single source of gaseous fumigant is connected to said gas recirculation circuit via a gas injector which is adapted to inject periodically a predetermined quantity of said gaseous fumigant into said gas recirculation circuit.

17. An arrangement as defined in claim 16, in which said injector is adapted to inject gas into said gas supply duct.

18. An arrangement as defined in claim 13, including a manometer operatively connected to said gas supply duct to monitor the static pressure therein.

19. An arrangement as defined in claim 18, in which said manometer is adapted to generate an electrical signal indicative of the pressure within said gas supply duct, and said manometer-generated signal is input to a system valve controller which is adapted to control the setting of said system valve to maintain the pressure within said gas supply duct at said predetermined pressure value or within said predetermined range of pressure values.

20. An arrangement as defined in claim 19, in which said system valve controller comprises a microprocessor which is adapted to receive said manometer-generated signal and to produce an output signal which controls the operation of a stepping motor which is operatively connected to said system valve.

21. A fumigation arrangement as defined in claim 13, in which (i) each silo in said storage facility is sealed to a gas-tightness standard, (ii) said fumigant is phosphine, and (iii) said single source of gaseous fumigant comprises a phosphine-releasing formulation within said gas supply duct, said formulation being adapted to release phosphine at a rate sufficient to maintain an acceptable concentration of phosphine in said recirculation circuit.

* * * * *

UNITED STATES PATENT AND TRADEMARK OFFICE
CERTIFICATE OF CORRECTION

PATENT NO. : 5,932,172

DATED : August 3, 1999

INVENTOR(S) : Winks, Robert Gordon

It is certified that error appears in the above-identified patent and that said Letters Patent is hereby corrected as shown below:

On the Title Page,
[73] Assignee:
change name to --Commonwealth Scientific and Industrial Research Organisation--.

[63] Related U.S. Application Data
line 4, delete "07/793,438, Feb. 10, 1992, said application No. 08/702,119," and insert
--07/793,438, Feb. 10, 1992; also--
line 5, delete "is"

[30] Foreign Application Priority Data
delete all applications listed in their entirety and insert
--Jun. 27, 1989   [AU]   Australia............PJ4936
  Dec. 14, 1994   [AU]   Australia............PN0044--

Under Other Publications
In the title of the second document
delete "fumigatig" and insert --fumigating--.

Signed and Sealed this

Twenty-seventh Day of March, 2001

*Attest:*

NICHOLAS P. GODICI

*Attesting Officer*    Acting Director of the United States Patent and Trademark Office